United States Patent [19]

Waddill et al.

[11] 4,164,520

[45] Aug. 14, 1979

[54] ACCELERATED CURE OF EPOXY RESINS

[75] Inventors: Harold G. Waddill, Austin; Howard P. Klein, Houston, both of Tex.

[73] Assignee: Texaco Development Corporation, White Plains, N.Y.

[21] Appl. No.: 927,260

[22] Filed: Jul. 24, 1978

Related U.S. Application Data

[63] Continuation-in-part of Ser. No. 865,053, Dec. 27, 1977, abandoned.

[51] Int. Cl.$^2$ .................................................. C08L 63/00
[52] U.S. Cl. ............................................................ 525/484
[58] Field of Search .................................................. 260/831

[56] References Cited

U.S. PATENT DOCUMENTS

| | | | |
|---|---|---|---|
| 3,306,809 | 2/1967 | Williamson | 260/831 |
| 3,719,724 | 3/1973 | Freeman | 260/831 |
| 3,734,965 | 5/1973 | Becker | 260/47 EN |
| 3,773,721 | 11/1973 | Tiedeman | 260/831 |
| 3,784,515 | 1/1974 | Freeman | 260/831 |
| 3,784,516 | 1/1974 | Baxter | 260/831 |
| 3,790,606 | 2/1974 | Sellet | 260/831 |
| 3,857,815 | 12/1974 | Smith | 260/831 |
| 3,896,081 | 7/1975 | Baxter | 260/831 |
| 3,994,989 | 11/1976 | Kempter | 260/831 |
| 4,001,155 | 1/1977 | Kempter | 260/831 |

*Primary Examiner*—Paul Lieberman
*Attorney, Agent, or Firm*—Carl G. Ries; Thomas H. Whaley; Kenneth R. Priem

[57] ABSTRACT

A process for the accelerated cure of an epoxy resin is disclosed. The resulting epoxy resin may be used in protective coatings, adhesives, seamless and terrazo flooring and caulking and sealing compositions. The resulting resin system is also useful, for example, in casting, potting, in escapulating, grouting and patching. The process involves mixing an epoxy resin of the polyhydric phenol, polyglycidyl ether type with a novel accelerator-hardener which is a condensation product of phenol, formaldehyde and an aminoalkylene derivative of a polyoxyalkylenepolyamine.

8 Claims, No Drawings

ACCELERATED CURE OF EPOXY RESINS

BACKGROUND OF THE INVENTION

This application is a continuation-in-part of Application Ser. No. 865,053, Dec. 27, 1977, now abandoned.

The present invention relates to the field of curing epoxy resins.

Polyoxypropylenepolyamines react with epoxy resins at a rate which is unsatisfactorily slow for certain applications. In order to provide a rate of cure which is satisfactory for most uses an accelerator must be used with the polyoxypropylenepolyamines in order to speed the rate of cure.

Lee, Henry and Neville, Kris, *Handbook of Epoxy Resins*, McGraw-Hill Book Co., N.Y., 1967, pp. 7–14, describes the use of N-(2-aminoethyl)piperazine as an epoxy curing agent and at pp. 11–18 describes the use of salicyclic acid as an accelerator for urea-formaldehyde epoxy resin coatings. Bobby Leger's U.S. Pat. No. 3,462,393 (Aug. 18, 1969) teaches the use of polyoxyalkylenepolyamines as curing agents for a polyglycidyl ether of a phenolic compound.

U.S. Pat. No. 3,639,928 claims the use of a combination of N-(3-aminopropyl)piperazine and salicyclic acid as an accelerator combination with polyoxyalkylenepolyamine for curing epoxy resins.

U.S. Pat. No. 3,734,965 describes the use of a condensation product of phenols, aldehydes and polyoxypropyleneamines.

SUMMARY OF THE INVENTION

The invention is a process for the accelerated cure of an epoxy resin composition of the polyhydric phenol, polyglycidyl ether type. The process involves mixing the epoxy resin with an accelerator-hardener which is a condensation product of phenol, formaldehyde and an aminoalkylene derivative of a polyoxyalkylenepolyamine. The invention is also the condensation product above and the resulting cured epoxy resin.

DESCRIPTION OF THE PREFERRED EMBODIMENTS

The epoxy resin used herein can be any of the well known epoxy resins having an epoxy equivalency of more than one, for example, the polyglycidyl ether of polyhydric phenol. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. The epoxy resin is derived from condensing epichlorohydrin with 2,2-bis(p-hydroxyphenyl) propane, known generally as bisphenol-A and having an epoxide equivalent weight of from 175 to 195.

The aminoalkylene derivatives of polyoxyalkylenepolyamines can be made by reacting polyoxyalkylenepolyamines with acrylonitrile followed by hydrogenation of the product. For example, polyoxypropylenepolyamines used as starting materials include compounds of the following formulae:

(I) $H_2NCH(CH_3)CH_2[OCH_2CH(CH_3)]_xNH_2$ where x=2 to 40, and

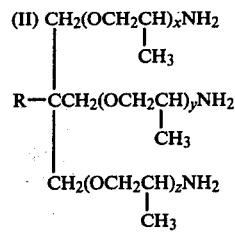

(II) $CH_2(OCH_2CH)_xNH_2$
         $|$
         $CH_3$ $R—CCH_2(OCH_2CH)_yNH_2$
      $|$
      $CH_3$ $CH_2(OCH_2CH)_zNH_2$
   $|$
   $CH_3$ where x+y+3=3 to 40, and (III) $H_2NCHCH_2(OCHCH_2)_x(OCH_2CH_2)_y(OCH_2CH)_zNH_2$
with CH$_3$ groups where x+z=2 to 10 and y=1 to 50

After reaction with acrylonitrile and subsequent hydrogenation the resulting aminoalkylene derivative of polyoxyalkylenepolyamines having the following formulae:

(IA) $H_2NCH_2CH_2CH_2HNCH(CH_3)CH_2[OCH_2CH(CH_3)]_xNHCH_2CH_2CH_2NH_2$ where x=2 to 40, and (IIA) $CH_2(OCH_2CH)_xNHCH_2CH_2CH_2NH_2$
          $|$
          $CH_3$ $R—CCH_2(OCH_2CH)_yNHCH_2CH_2CH_2NH_2$
      $|$
      $CH_3$ $CH_2(OCH_2CH)_zNHCH_2CH_2CH_2NH_2$
   $|$
   $CH_3$ where x+y+z=3 to 40, and (IIIA) $H_2CH_2CH_2CH_2HNCHCH_2(OCHCH_2)_x(OCH_2CH_2)_y(OCH_2CH)_z NHCH_2CH_2CH_2NH_2$
with CH$_3$ groups where x+z=2 to 10 and y=1 to 50

It is preferred to use phenol but substituted phenols are also useful in the condensate. The substituted phenols include, for example, mono- or polyhydric phenols with at least one reactive nuclear position available for substitution (o or p). Examples: o-, m-, p-cresol, resorcinol, pyrocatechol, hydroquinone, phloroglucinol, pryogallol, α and β-naphthol, p-tert-butylphenol, 4,4'-dihydroxydiphenylmethane, 4,4'-dihydroxydiphenylether, 4,4'-dihydroxydiphenylsulphone. It is preferred to use formaldehyde but useful aldehydes include both aliphatic and aromatic aldehydes, for example: acetaldehyde, butyraldehyde, benzaldehyde. Aldehydes of the general formula below are useful:

RHCO wherein R=H—, CH$_3$—, C$_2$H$_5$—C$_4$H$_9$ or

The preparation of the condensation product is performed as follows but obvious deviations from this scheme are included in our invention: phenol, formaldehyde and a small amount of triethylamine is heated at reflux (~100° C.) for 1–2 hours and then cooled to <50° C. Amine (aminoalkylene derivative of polyoxyalkylenepolyamines) addition is begun while raising the temperature to about 165° C. while water is removed. Water is removed until overhead temperature drop is noted. The product is then vacuum stripped at 150° C./30mm for 2-4 hours.

The pressure is atmospheric except where vacuum stripping is noted. No pH adjustment is made during the reaction. The ratio of aminoalkylene derivative of polyoxyalkylenepolyamine/phenol/formaldehyde may range about 3/1/1 to 1/1/1. These variables are only guidelines and should not be construed as limitative of the invention claimed hereinafter.

For curing epoxy resins, the hardening agent (the condensate herein) is usually added in an amount such that there is one reactive —NH group in the hardener component for each epoxy group in the epoxy resin component. These are known as stoichiometric quantities. The stoichiometric quantity can be calculated from a knowledge of the chemical structure and analytical data on the components. In general it is advantageous to use up to 10 percent excess of the accelerated hardener over the stoichiometric amount.

The curing temperature range of the ambient temperatures are from about 0° to about 45° C. Post cures at temperatures up to about 200° C. are optional. The cured epoxy resins of the invention are useful in castings, coatings, adhesives, laminates, filament-reinforced composites, seamless flooring, terrazzo flooring, crushed-stone aggregates and in grouting, caulking and sealing compositions.

EXAMPLE I

Preparation of a condensate of the aminopropylene derivative of a 230 molecular weight polyoxypropylenepolyamine with phenol and formaldehyde.

| Reactants: | |
|---|---|
| JEFFAMINE ®D-230 Bis(propylamine)* (JEFFAMINE ®D-230 BPA) | 1338 g. |
| Phenol | 355 g. |
| Formaldehyde | 306 g. (37% soln.) |
| Triethylamine(TEA) | 10 g. |

*JEFFAMINE D-230 is a polyoxypropylenepolyamine of formula I (x is about 2.6) and JEFFAMINE D-230 Bis(propylamine) is the aminopropylene derivative of JEFFAMINE D-230.

The phenol, formaldehyde and TEA were added to a reactor and heated to reflux temperature (about 100° C.) for 2 hours and then cooled to 95° C. The JEFFAMINE D-230 BPA was added to the mixture in the reactor while raising the temperature to about 135° C. The product was then vacuum stripped at 130° C./30mm for 2 hours.

EXAMPLE II

Preparation of a condensate of the aminopropylene derivative of a 400 molecular weight polyoxypropylenepolyamine with phenol and formaldehyde.

| Reactants: | |
|---|---|
| JEFFAMINE ®D-400 Bis(propylamine)* | 1368 g. |
| Phenol | 259 g. |
| Formaldehyde | 223 g. (37% soln.) |
| Triethylamine (TEA) | 9.25 g. |

*JEFFAMINE D-400 is a polyoxypropylenepolyamine of formula I (x is about 5.6) and JEFFAMINE D-400 is Bis(propylamine) BPA is the aminopropylene derivative of JEFFAMINE D-400.

The procedure in Example I was followed except the maximum temperature of the reactor was 165° C. prior to vacuum stripping.

EXAMPLE III

| Acceleration of Cure Through Use of Phenol-Formaldehyde Condensate of an Aminoalkylene Derivative of a Polyoxyalkylpolyamine | | | | |
|---|---|---|---|---|
| Formulation: | A | B | C | D |
| Epoxy Resin (EEW 190) | 100 | 100 | 100 | 100 |
| JEFFAMINE D-400 Bis(propylamine) | 46 | — | — | — |
| JEFFAMINE D-400 BPA** Phenol Formaldehyde Condensate | — | 52 | — | — |
| JEFFAMINE D-230 Bis(propylamine) | — | — | 30 | — |
| JEFFAMINE D-230 BPA Phenol Formaldehyde Condensate | — | — | — | 38 |
| Gel time, mins. (200 g. mass) | 160.3 | 92.4 | 73.5 | 30.8 |
| Peak Exotherm, °C. | 160.0 | 126.5 | 224.0 | 213.0 |
| Time to peak, mins. | 178.0 | 114.0 | 85.0 | 43.0 |

EXAMPLE IV

| Development of Adhesion: Curing with Phenol . Formaldehyde Condensate vs. JEFFAMINE D-230 BPA | | |
|---|---|---|
| Formulation | A | B |
| Epoxy resin (EEW 185) | 100 | 100 |
| JEFFAMINE D-230 Bis(propylamine) | 30 | — |
| JEFFAMINE D-230 BPA . Phenol . Formaldehyde Condensate | — | 38 |
| Tensile shear strength, psi after curing for: 4 hours | <5 | 0 |
| 8 hours | 900 | 1100 |
| 16 hours | 2200 | 2900 |
| 24 hours | 1200 | 3000 |

EXAMPLE V

| Comparison of Condensation Product of This Invention With Similar Condensate Using Polyoxypropyleneamines | | | |
|---|---|---|---|
| Comparison of Properties: Curing with JEFFAMINE D-400; D-400 . Phenol . formaldehyde Condensate and BPA D-400 . Phenol . formaldehyde Condensate | | | |
| Formulation: | A | B | C |

-continued

Comparison of Condensation Product of This Invention With Similar Condensate Using Polyoxypropyleneamines

| | | | |
|---|---|---|---|
| Epoxy resin (EEW 185) | 100 | 100 | 100 |
| JEFFAMINE D-400 | 50 | — | — |
| D-400 . Phenol . CH$_2$O Cond. | — | 75 | — |
| BPAD-400 . Phenol . CH$_2$O Cond. | — | — | 55 |
| Brook. visc., cps., R.T. | 500 | 3800 | 4700 |
| Gel time, mins (200 g. mass) | ~300 | 142 | 28.3 |
| Peak exotherm, °C. | — | 71.5 | 164.0 |
| Time to peak temp., mins. | — | 180 | 38.0 |
| Drying time, 6-mil film | | | |
|   Set-to-touch, hrs. | 13.3[2] | 9.9 | 4.0 |
|   Thru-dry, hrs. | 15.2 | 13.2 | 5.0 |
| Rev. impact, in-lbs to fail | | | |
|   cure: 24 hr., R.T. | >160 | 148 | >160 |
|   7 day, R.T. | >160 | 12 | 20 |
|   14 day, R.T. | >160 | 100 | 100 |
| Properties of cured ¼″ castings:[1] | | | |
| Izod impact strength, ft-lbs/in. | 0.52 | 0.97 | 0.94 |
| Tensile strength, psi | 8200 | 9100 | 9300 |
| Tensile modulus, psi | 399000 | 456000 | 438000 |
| Elongation at break, % | 3.7 | 4.6 | 6.0 |
| Flexural strength, psi | 12200 | 13200 | 14200 |
| Flexural modulus, psi | 400000 | 447000 | 457000 |
| HDT, °C., 264 psi/66 psi | 41.5/42 | 46/50 | 56/59 |
| Shore D hardness, 0–10 sec. | 80–77 | 84–82 | 86–85 |
| % wt. gain, 1 hr. acetone boil | — | 13.67 | 5.36 |
| % wt. gain, 24 hr. H$_2$O boil | — | 2.34 | 2.94 |

[1]Cured 2 hrs. 80°, 3 hrs. 125° C.
[2]D-400 Concn. = 55 phr.

Comparison of Properties: Curing with JEFFAMINE D-400, D-300 . Phenol . CH$_2$O Condensate and BAPD-400 . 155 Phenol · CH$_2$O Condensate (Acc. Curing, R.T.)

| Formulation: | A | B | C |
|---|---|---|---|
| Epoxy resin (EEW 185) | 100 | 100 | 100 |
| JEFFAMINE D-400 | 45 | — | — |
| D-400 . Phenol . CH$_2$O Cond. | — | 75 | — |
| BPAD 400 . Phenol . CH$_2$O Cond. | — | — | 55 |
| Acc. 398 | 10 | 10 | 10 |
| Brook. visc., cps., R.T. | — | 3800 | 5000 |
| Gel time, mins. (200 g. mass) | 41.0 | 31.2 | 14.2 |
| Peak exotherm, °C. | 163.0 | 164.0 | 194.0 |
| Time to peak, mins. | — | 42.0 | 19.5 |
| Drying time, 6-mil film | | | |
|   Set-to-touch, hrs. | 8.3 | 6.0 | 2.0 |
|   Thru-dry, hrs. | 11.8 | 8.8 | 3.0 |
| Rev. impact, in-lbs to fail | | | |
|   Cure: 24 hr., R.T. | >160 | >160 | >160 |
|   1 hr. 110° C. | >160 | >160 | 80 |
|   7 day, R.T. | >160 | 88 | 20 |
|   14 day, R.T. | >160 | >160 | 80 |
| Properties of cured ¼″ castings:[1] | | | |
| Izod impact strength, ft-lbs/in. | 0.62 | 0.88 | 0.98 |
| Tensile strength, psi | 7500 | 7000 | 9600 |
| Tensile modulus, psi. | 388000 | 418000 | 452000 |
| Elongation at break, % | 5.1 | 20.8 | 5.0 |
| Flexural strength, psi. | 9900 | 10900 | 15100 |
| Flexural modulus, psi. | 335000 | 336000 | 451000 |
| HDT, °C., 264 psi/66 psi | 40/42.5 | 37/39 | 48/49 |
| Shore D hardness, 0–10 sec. | 83–80 | 82–80 | 82–80 |
| % wt. gain, 1 hr. acetone boil | — | 14.40 | 9.06 |
| % wt. gain, 24 hr. H$_2$O boil | — | 4.67 | 3.75 |

[1]Cured 7 days, R.T.

It is clear from the above example that the drying times and touch times are much less using the condensate of the invention than with the prior art condensate or using polyoxypropyleneamines alone.

We claim:

1. A process for curing epoxy resins comprising: mixing an epoxy resin with about a stoichiometric amount of a condensation product of phenol, formaldehyde and an aminoalkylene derivative of a polyoxyalkylenepolyamine made by reacting a polyoxyalkylene polyamine with acrylonitrile followed by hydrogenation.

2. A process as in claim 1 wherein the curing takes place from about 0° C. to about 45° C.

3. A process as in claim 2 wherein a post cure is employed at a temperature up to about 200° C.

4. A process as in claim 1 wherein the aminoalkylene derivative of a polyoxyalkylenepolyamine is an aminopropylene derivative of a polyoxypropylenepolyamine.

5. A process for curing epoxy resins comprising: mixing an epoxy resin with about a stoichiometric amount of a condensation product of a phenolic compound, an aldehyde and an aminoalkylene derivative of a polyoxyalkylenepolyamine made by reacting a polyoxyalkylenepolyamine with acrylonitrile followed by hydrogenation.

6. A process as in claim 5 wherein the curing takes place from about 0° C. to about 45° C.

7. A process as in claim 6 wherein a post cure is employed at a temperature up to about 200° C.

8. A cured epoxy resin composition made by mixing an epoxy resin with a condensation product of phenol, formaldehyde and an aminoalkylene derivative of a polyoxyalkylenepolyamine made by reacting a polyoxyalkylenepolyamine with acrylonitrile followed by hydrogenation.

* * * * *